United States Patent
Ridihalgh et al.

(10) Patent No.: US 9,937,422 B2
(45) Date of Patent: Apr. 10, 2018

(54) VOXEL-BASED, REAL-TIME ACOUSTIC ADJUSTMENT

(71) Applicant: Microsoft Technology Licensing, LLC, Redmond, WA (US)

(72) Inventors: Robert Lucas Ridihalgh, Woodinville, WA (US); Jeffrey Ballard, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 14/964,390

(22) Filed: Dec. 9, 2015

(65) Prior Publication Data
US 2017/0165575 A1   Jun. 15, 2017

(51) Int. Cl.
G06F 17/00 (2006.01)
A63F 13/54 (2014.01)
A63F 13/57 (2014.01)
H04S 7/00 (2006.01)

(52) U.S. Cl.
CPC .............. *A63F 13/54* (2014.09); *A63F 13/57* (2014.09); *H04S 7/303* (2013.01); *H04S 2400/11* (2013.01)

(58) Field of Classification Search
CPC .......... A63F 13/54; A63F 13/57; H04S 7/303; H04S 2400/11
See application file for complete search history.

(56) References Cited

U.S. PATENT DOCUMENTS 5,315,512 A     5/1994   Roth
5,995,447 A    11/1999   Mandal et al.
8,525,834 B2    9/2013   Salemann
8,587,583 B2   11/2013   Newcombe et al.
2008/0183077 A1  7/2008   Moreau-Gobard et al.
2010/0156901 A1  6/2010   Park et al.
(Continued)

FOREIGN PATENT DOCUMENTS

WO    2014146668 A2    9/2014

OTHER PUBLICATIONS

Söderberg, Martin & Lindell, Rikard, Enhancing the audio environment in virtual city scenes, 2008, pp. 1-30.*
Röber, et al., "Ray Acoustics Using Computer Graphics Technology", In Proceedings of the 10th International Conference on Digital Audio Effects, Sep. 10, 2007, 8 pages.
(Continued)

*Primary Examiner* — Joseph Saunders, Jr.
(74) *Attorney, Agent, or Firm* — Klarquist Sparkman, LLP

(57) ABSTRACT

Systems, methods, and computer media for adjusting acoustics in real time are provided herein. An acoustic adjustment system can include a processor, a memory, a voxelizer, and a pathing analyzer. The voxelizer can be configured to generate a voxel-based representation of a three-dimensional (3D) interactive media environment. The voxel-based representation includes a number of individual voxels that together represent the environment. The voxelizer can also be configured to identify a plurality of blocked voxels that intersect visual elements of the 3D interactive media environment. The pathing analyzer can be configured to determine, for the clear voxels, audio path information representing a path of clear voxels between the voxel and the location of the listener. The audio path information can be used to adjust sounds emitted by sound emitters in the media environment to realistically reflect the distances the sound travels to reach the listener.

17 Claims, 12 Drawing Sheets

(56) References Cited

U.S. PATENT DOCUMENTS

| | | | |
|---|---|---|---|
| 2011/0081023 | A1 | 4/2011 | Raghuvanshi et al. |
| 2011/0149680 | A1 | 6/2011 | Oishi |
| 2011/0254842 | A1 | 10/2011 | Dmitrieva et al. |
| 2012/0093320 | A1 | 4/2012 | Flaks et al. |
| 2012/0179041 | A1 | 7/2012 | Nakagawa |
| 2013/0249914 | A1 | 9/2013 | Ignatoff |
| 2014/0342823 | A1 | 11/2014 | Kapulkin et al. |
| 2015/0378019 | A1* | 12/2015 | Schissler ............... G06T 15/06 700/94 |

OTHER PUBLICATIONS

Taylor, et al., "Interactive Geometric Sound Propagation and Rendering", Published on: Jun. 24, 2010 Available at: https://software.intel.com/sites/default/files/m/d/4/1/d/8/InteractiveGeometricSoundPropagationandRendering.pdf.

Zimmermann, et al., "FPGA-based Real-Time Acoustic Camera Prototype", In Proceedings of the International Symposium on Circuits and Systems, May 30, 2010, 4 pages.

Second Written Opinion, International Application No. PCT/US2016/062986, 4 pages, Jun. 20, 2017.

International Search Report and Written Opinion, International Application No. PCT/US2016/062986, 13 pages, Feb. 28, 2017.

Huang et al., "Spread: Sound Propagation and Perception for Autonomous Agents in Dynamic Environments," *Proceedings of the 12th ACM Siggraph/Eurographics Symposium on Computer Animation, SCA '13*, pp. 135-144, Jan. 1, 2013.

Filion, "Potentially Audible Sets," In: *Game Programming Gems 6*, ed. Mike Dickheiser, pp. 561-571, Mar. 7, 2006.

Raghuvanshi et al., "Efficient and Accurate Sound Propagation Using Adaptive Rectangular Decomposition," *IEEE Transactions on Visualization and Computer Graphics*, vol. 15, No. 5, Sep. 1, 2009, pp. 789-801.

Röber et al., "Ray Acoustics Using Computer Graphics Technology," *Proceedings of the 10th International Conference on Digital Audio Effects*, 8 pp., Sep. 10, 2007, https://pdfs.semanticscholar.org/263c/f4ce88085b91cc324bd241ff4b4328c878bf.pdf (retrieved Feb. 20, 2017).

Haumont et al., "Volumetric Cell-and-Portal Generation," *Computer Graphics Forum*, vol. 22, No. 3, pp. 303-312, Sep. 1, 2003.

Upson et al., "V-Buffer: Visible Volume Rendering," *Computer Graphics, ACM*, US, vol. 22, No. 4, pp. 59-64, Jun. 1, 1988.

"International Preliminary Report on Patentability Issued in PCT Application No. PCT/US2016/062986", dated Dec. 18, 2017, 9 Pages.

* cited by examiner

FIG. 2

| 10.5 | 9.5 | 8.5 | 8.1 | 7.7 | 7.2 | 6.8 | 6.4 | 6.0 | x | 17.7 | 18.1 |
|---|---|---|---|---|---|---|---|---|---|---|---|
| 10.1 | 9.1 | 8.1 | 7.1 | 6.7 | 6.2 | 5.8 | 5.4 | 5.0 | x | 16.7 | 17.1 |
| 9.7 | 8.7 | 7.7 | 6.7 | 5.7 | 5.2 | 4.8 | 4.4 | 4.0 | x | 15.7 | 16.1 |
| 9.2 | 8.2 | 7.2 | 6.2 | 5.2 | 4.2 | 3.8 | 3.4 | 3.0 | x | 14.7 | 15.1 |
| 8.8 | 7.8 | 6.8 | 5.8 | 4.8 | 3.8 | 2.8 | 2.4 | 2.0 | x | 13.7 | 14.1 |
| 8.4 | 7.4 | 6.4 | 5.4 | 4.4 | 3.4 | 2.4 | 1.4 | 1.0 | x | 12.7 | 13.1 |
| 8.0 | 7.0 | 6.0 | 5.0 | 4.0 | 3.0 | 2.0 | 1.0 | L | x | 11.7 | 12.1 |
| 8.4 | 7.4 | 6.4 | 5.4 | 4.4 | 3.4 | 2.4 | 1.4 | 1.0 | x | 10.7 | 11.1 |
| 8.8 | 7.8 | 6.8 | 5.8 | 4.8 | 3.8 | 2.8 | 2.4 | 2.0 | x | 9.7 | 10.1 |
| x | x | x | x | x | x | 3.8 | x | x | x | 8.7 | 9.7 |
| 10.2 | 9.2 | 8.2 | 7.2 | 6.2 | 5.2 | 4.8 | 5.2 | 6.2 | 7.2 | 8.2 | 9.2 |
| 10.7 | 9.7 | 8.7 | 7.7 | 6.7 | 6.2 | 5.8 | 6.2 | 6.7 | 7.7 | 8.7 | 9.7 |

FIG. 3

| 19.7 | 19.3 | 18.9 | 18.5 | 18.1 | 17.7 | 17.2 | 17.7 | 18.1 | x | 6.4 | 6.0 |
|---|---|---|---|---|---|---|---|---|---|---|---|
| 18.7 | 18.3 | 17.9 | 17.5 | 17.1 | 16.7 | 16.2 | 16.7 | 17.1 | x | 5.4 | 5.0 |
| 17.7 | 17.3 | 16.9 | 16.5 | 16.1 | 15.7 | 15.2 | 15.7 | 16.1 | x | 4.4 | 4.0 |
| 16.7 | 16.3 | 15.9 | 15.5 | 15.1 | 14.7 | 14.2 | 14.7 | 15.1 | x | 3.4 | 3.0 |
| 16.3 | 15.3 | 14.9 | 14.5 | 14.1 | 13.7 | 13.2 | 13.7 | 14.1 | x | 2.4 | 2.0 |
| 15.9 | 14.9 | 13.9 | 13.5 | 13.1 | 12.7 | 12.2 | 12.7 | 13.1 | x | 1.4 | 1.0 |
| 15.5 | 14.5 | 13.5 | 12.5 | 12.1 | 11.7 | 11.2 | 11.7 | 12.1 | x | 1.0 | L |
| 15.1 | 14.1 | 13.1 | 12.1 | 11.1 | 10.7 | 10.2 | 10.7 | 11.1 | x | 1.4 | 1.0 |
| 14.7 | 13.7 | 12.7 | 11.7 | 10.7 | 9.7 | 9.2 | 9.7 | 10.7 | x | 2.4 | 2.0 |
| x | x | x | x | x | x | 8.2 | x | x | x | 3.4 | 3.0 |
| 13.8 | 12.8 | 11.8 | 10.8 | 9.8 | 8.8 | 7.8 | 6.8 | 5.8 | 4.8 | 4.4 | 4.0 |

# VOXEL-BASED, REAL-TIME ACOUSTIC ADJUSTMENT

BACKGROUND

As computer software and hardware have become more powerful and advanced, media environments, such as video game environments, have become richer and more realistic. Graphics, movement of characters and avatars, and the interaction of various visual elements have all become increasingly realistic. Despite the advances in other aspects of media environments, however, providing realistic sound remains extremely difficult and computationally complex. Conventional approaches to simulating realistic sound are also typically too computationally intense to adapt quickly to changes in the media environment.

SUMMARY

Examples described herein relate to acoustic adjustment based on voxelized representations of 3D media environments. An acoustic adjustment system can include a processor, a memory, a voxelizer, and a pathing analyzer. The voxelizer can be configured to generate, by the processor, a voxel-based representation of a three-dimensional (3D) interactive media environment. The voxel-based representation includes a plurality of voxels, which can be of a uniform size. The voxelizer can also be configured to store the voxel-based representation in the memory and to identify, by the processor, a plurality of blocked voxels. Blocked voxels are voxels that intersect visual elements of the 3D interactive media environment. The pathing analyzer can be configured to determine, by the processor and for the clear voxels, audio path information representing a path of clear voxels between the voxel and the location of the listener, wherein clear voxels are voxels other than blocked voxels.

The path of clear voxels can indicate, for example, a shortest path of sound, in the 3D interactive media environment, between a voxel and the listener. The shortest path can account for propagation of sound around obstacles. In some examples, the acoustic adjustment system also determines reverberation information for the location of the listener and/or location of a sound emitter. The audio path information and/or reverberation information can be used to adjust sounds emitted by sound emitters to realistically reflect the distances the sound travels to reach the location of the listener, the characteristics of the listener's environment, and/or the characteristics of the sound emitter's environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

BRIEF DESCRIPTION OF THE DRAWINGS

FIG. 2 is a diagram illustrating an example two-dimensional (2D) voxel-based representation of a media environment, the voxel-based representation indicating distance from each clear voxel to a listener location.

FIG. 3 is a diagram illustrating an example 2D voxel-based representation of a media environment, the voxel-based representation indicating distance from each clear voxel to a listener location and an audio path in which the sound travels around an obstruction to reach the listener location.

DETAILED DESCRIPTION

Figure 1:
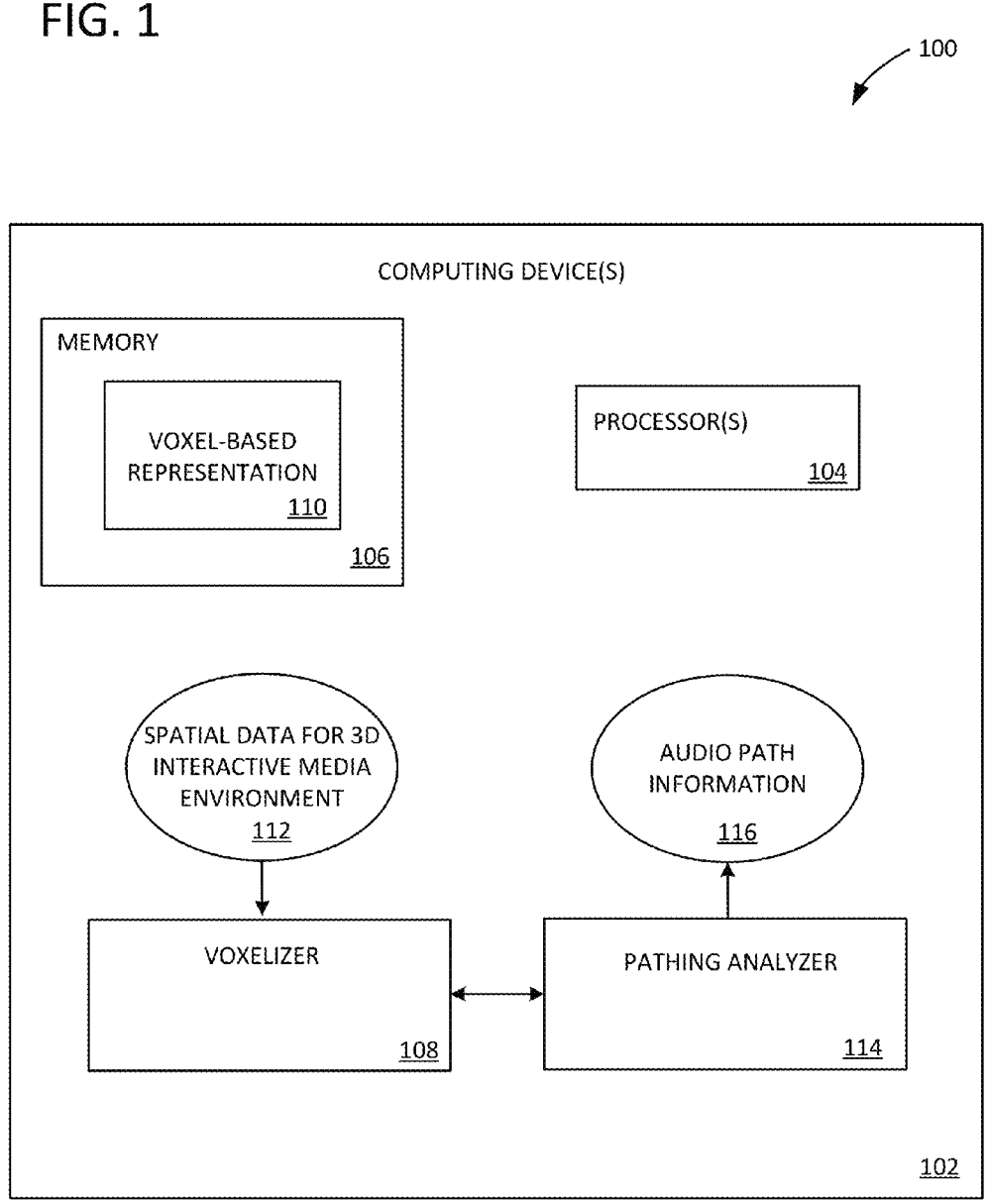
FIG. 1 is a block diagram of an example acoustic adjustment system.

Using the systems, methods, and computer-readable media described herein, acoustics in 3D media environments can be adjusted in real time to accurately reflect the characteristics of the media environment. Unlike conventional attempts to realistically simulate sound in media environments, the described examples allow real-time analysis by using a computationally efficient voxel-based representation of the 3D media environment. The described examples can also account for both the distance sound travels, including indirect paths, as well as reverberation in the listener's immediate area and reverberation in a sound emitter's immediate area, allowing a realistic acoustic simulation.

As an example, in a video game environment, spatial information (e.g., dimensions, locations of visual elements, etc.) representing the video game environment can be used to generate a voxel-based representation of the video game environment in which the volume of the game environment is divided into a number of voxels (e.g., equally sized cubes). The voxel-based representation is a simplified representation of the video game environment that allows for faster and more computationally efficient acoustic propagation calculations. For voxels containing visual elements (also referred to as "geometry") of the video game environment (such as walls, trees, etc.), the voxels can be designated as "blocked" to indicate an obstruction to sound.

A clear-voxel distance, which accounts for obstruction by blocked voxels, can be determined from the locations of sound emitters to the current position of a listener. This clear-voxel distance can be used to adjust the audio generated in the video game environment to more closely correspond to what a listener would actually hear given the locations of the sound emitters and the known obstructions (blocked voxels). For example, if the sound takes an indirect path around obstructions, and the indirect path is twice as far as a direct path (assuming no obstructions were present), some of the high-frequency components of the sound will be disproportionately attenuated by the increased distance as compared to the low-frequency components of the sound.

Continuing the above example, the characteristics of the video game environment can also be used to determine reverberation information from the listener's perspective. This can be done, for example, by determining a distance, from the listener, to the nearest blocked voxel in many directions, and in some examples, the type of material and corresponding acoustic properties of the blocked voxels. The locations of blocked voxels inform the way in which sound is reflected around the listener. For example, if a wall in the 3D media environment (represented as blocked voxels) is six inches behind the listener, sound will reverberate differently than if the nearest blocked voxel is 20 feet behind the listener.

In the described examples, the computational complexity of determining audio path information (e.g., distance between sound emitters and the listener) and reverberation is reduced through the voxel-based approach, which reduces the amount of processing power, memory, and energy needed to accurately simulate acoustics in the media environment and allows the simulated acoustics to be updated in real time as the location of the listener changes, the locations of sound emitters change, or the geometry of the media environment changes. Examples are described below with reference to FIGS. 1-12.

FIG. 1 illustrates an acoustic adjustment system 100 implemented on one or more computing device(s) 102. Computing device(s) 102 includes processor(s) 104 and a memory 106. A voxelizer 108 is configured to, by processor(s) 104, generate a voxel-based representation 110 of a three-dimensional (3D) interactive media environment. For example, voxelizer 108 can receive spatial information 112 representing the 3D interactive media environment, such as coordinate values demarcating a volume extent of the environment and coordinates or other information indicating the location of visual elements in the environment. Voxelizer 108 can then divide the volume into voxels. As used herein, voxels are volume elements (units of volume) similar to how pixels are two-dimensional (2D) area elements. Voxels can be, for example, cubes of a uniform size. Voxelizer 108 can divide a volume according to different resolutions (i.e., different numbers of voxels per unit of measured volume). The 3D interactive media environment can be, for example, a video game environment, a virtual reality environment, or an augmented reality environment.

Voxel-based representation 110 is a simplified representation of the 3D interactive media environment, and different resolutions allow for more or less accuracy (where a lower resolution results in a lower computational complexity). Voxelizer 108 can be configured to store voxel-based representation 110 in memory 106. Voxelizer 108 can also be configured to identify, by the processor, a plurality of blocked voxels. Blocked voxels are voxels that intersect visual elements of the 3D interactive media environment. Information indicating the location of visual elements can be included in the spatial information 112 and can also be referred to as the "geometry" or "triangles" of the environment. Voxelizer 108 can determine intersections of visual elements with voxels by comparing the locations of the geometry with the extent of the individual voxels. If there is an intersection, voxelizer 108 can designate the entire voxel as blocked.

Blocked voxels can obstruct or occlude sound. As used herein, "obstruction" refers to one or more blocked voxels that prevent sound waves from propagating along a direct path to a listener but still allow an indirect path to the listener. As used herein, "occlusion" refers to a group of blocked voxels that prevent sound from propagating to the listener by either a direct or indirect path. An example of obstruction is a wall of a room with an open door separating a radio playing in the room from a listener standing outside the room. The wall of the room obstructs the most direct path for sound to travel from the radio to the listener (through the wall), but the sound can travel through the door and around to the listener. An example of occlusion is a radio playing inside of safe or other enclosure. In some instances, sound can propagate through a material even though the material completely encloses the sound. In such examples, an amount of occlusion can be determined by the material's audio propagation properties (also referred to as the material's audio "transparency").

A pathing analyzer 114 can be configured to determine, by processor 104 and for respective voxels of the plurality of voxels that are clear voxels, audio path information 116 representing a path of clear voxels between the voxel and a location of the listener. Clear voxels are voxels other than blocked voxels. The path of clear voxels indicates a path of sound, in the 3D interactive media environment, between a location corresponding to the voxel and the location of the listener. The path of clear voxels can be, for example, a shortest clear voxel path. In some examples, pathing analyzer 114 is configured to determine multiple clear voxel paths between individual clear voxels and the location of the listener, and audio path information 116 can represent the multiple paths.

Audio path information 116 can include a length of the path of clear voxels. This is illustrated in FIGS. 2-3. FIG. 2 illustrates an example 2D voxel-based representation 200 of a media environment. FIG. 2 shows a 2D example for ease of illustration, which can be thought of as a volume cross section. In FIG. 2, blocked voxels are denoted with an "X." For clear voxels, a shortest clear-voxel distance to the listener is shown. The listener is located in voxel 202 and is denoted with an "L." The bolded voxels extending from voxel 204 to voxel 202 indicate a shortest clear-voxel path between voxel 204 and voxel 202.

FIG. 3 illustrates another example 2D voxel-based representation 300 of a media environment. As in FIG. 2, In FIG. 3, blocked voxels are denoted with an "X," the listener is denoted with an "L" (in voxel 302), and clear voxels indicate a shortest clear-voxel distance to the listener. In FIG. 3, a number of blocked voxels create an obstruction between voxel 304 and the listener at voxel 302. If the blocked voxels were clear, a shortest path between voxels 304 and 302 would extend horizontally between voxels 304 and 302. Because of the obstruction, the shortest clear voxel path (shown by bolded boxes) is indirect and passes through voxel 306. If voxel 306 were also blocked, then voxel 304 would be occluded from the listener in voxel 302. The path distance shown in each voxel is calculated using the distance between voxel centers in the path. Accordingly, while the distance between a voxel and an adjacent horizontal or vertical voxel is 1.0, the distance between adjacent diagonal voxel centers, such as between voxel 308 and 310, is approximately 1.4 (the square root of two).

Returning to FIG. 1, audio path information 116 can also include an angle from the voxel to the next voxel of the path of clear voxels. In this way, each voxel on the clear voxel path is associated with the angle to the next voxel in the direction of the listener. The angle can be, for example, in the form of an x-direction, y-direction, and z-direction angle component or an x-direction, y-direction, and z-direction distance to the next voxel center.

Pathing analyzer 114 can be further configured to determine a ratio of the length of the path of clear voxels to a shortest distance between the voxel and the location of the listener. The shortest distance corresponds to the length of a line connecting the voxel and the location of the listener. The ratio indicates an audio adjustment that accounts for the length of the path of clear voxels, and can be used to determine an obstruction value. For example, if the clear voxel path is 20, and the shortest (direct, ignoring blocked voxels) path is 10, the ratio is 2:1. This can be converted to an obstruction value through a variety of approaches. In one example, obstruction values of 0.0 result when the ratio is 1:1, and obstruction values of 1.0 result when the ratio is infinity (or very large):1. Occlusion can be indicated with values of 1, for example, if a voxel is occluded, and 0 if the voxel is not occluded.

The length of the acoustic path that audio travels can affect the frequency composition of a received signal as compared to an emitted signal. For example, over long distances, higher frequency components of an audio signal tend to attenuate disproportionately to lower frequency components. Given knowledge of the ratio between the clear voxel path traveled and what a direct path (absent blocked voxels) would have been allows the frequencies of the audio received at the listener location to be adjusted accordingly for realistic simulation.

Pathing analyzer 114 can determine audio path information 116 through, for example, a floodfilling approach in which after a starting voxel is examined, an adjacent voxel is examined, followed by another, etc., until the entire clear voxel space of voxel-based representation 110 has been examined.

Pathing analyzer 114 can store audio path information 116, and an application such as a video game application or virtual reality application can provide locations of sound emitters. The voxel(s) corresponding to the sound emitter can be identified by system 100, and audio path information for the voxel can be accessed, providing a "look up" of audio path information given a location.

Pathing analyzer 114 can perform floodfilling or other approaches to determine audio path information 116 for the respective clear voxels again periodically or upon determining that the 3D interactive media environment has changed, a sound emitter has moved, or the listener has moved. Frequent updates can be performed with limited computing resources because of the computational efficiency of using voxel-based representation 110.

Figure 4:
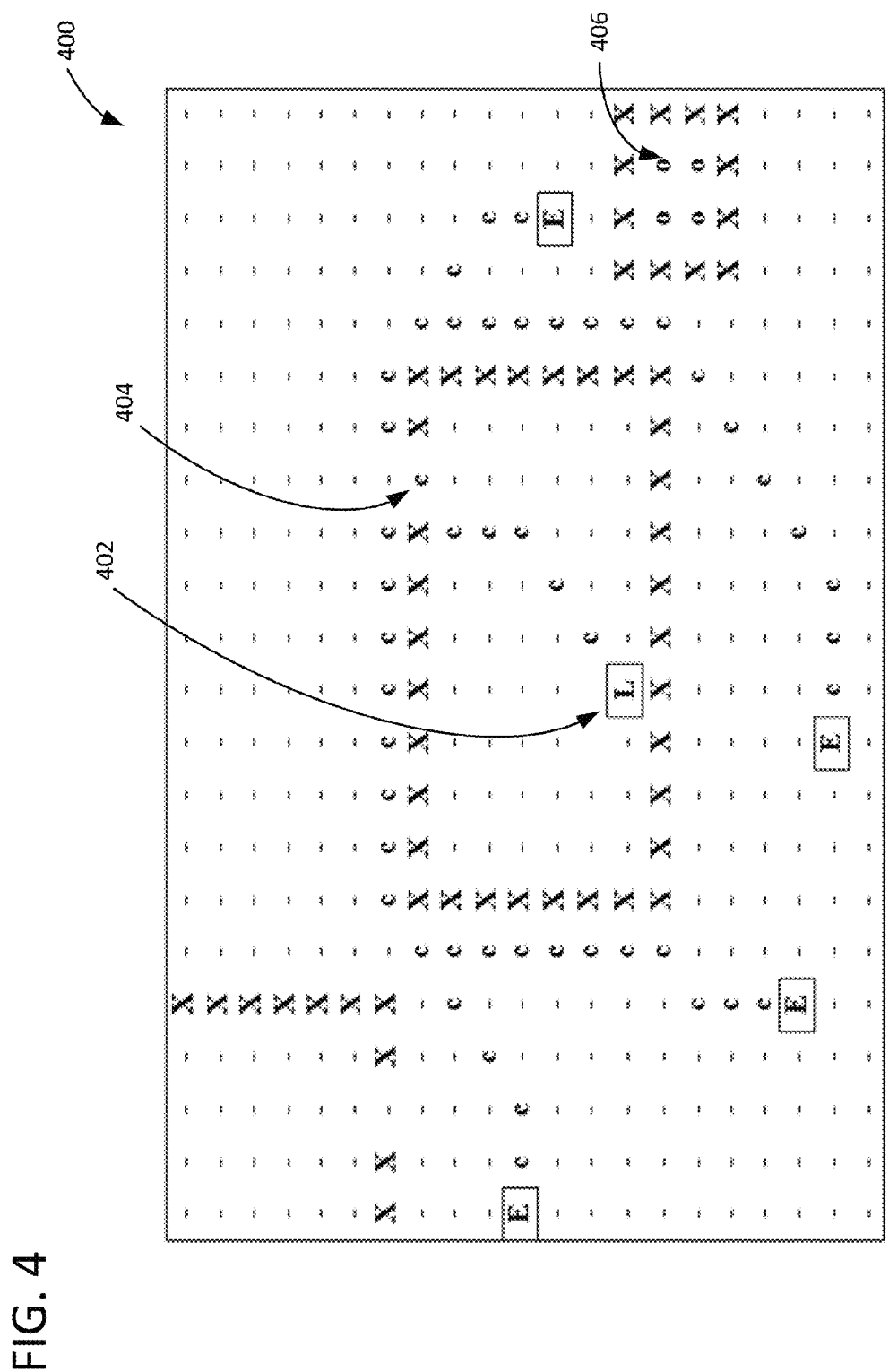
FIG. 4 is a diagram illustrating an example 2D voxel-based representation of a media environment, the voxel-based representation indicating audio paths from sound emitters, around obstructions, to a listener location.
Figure 5:
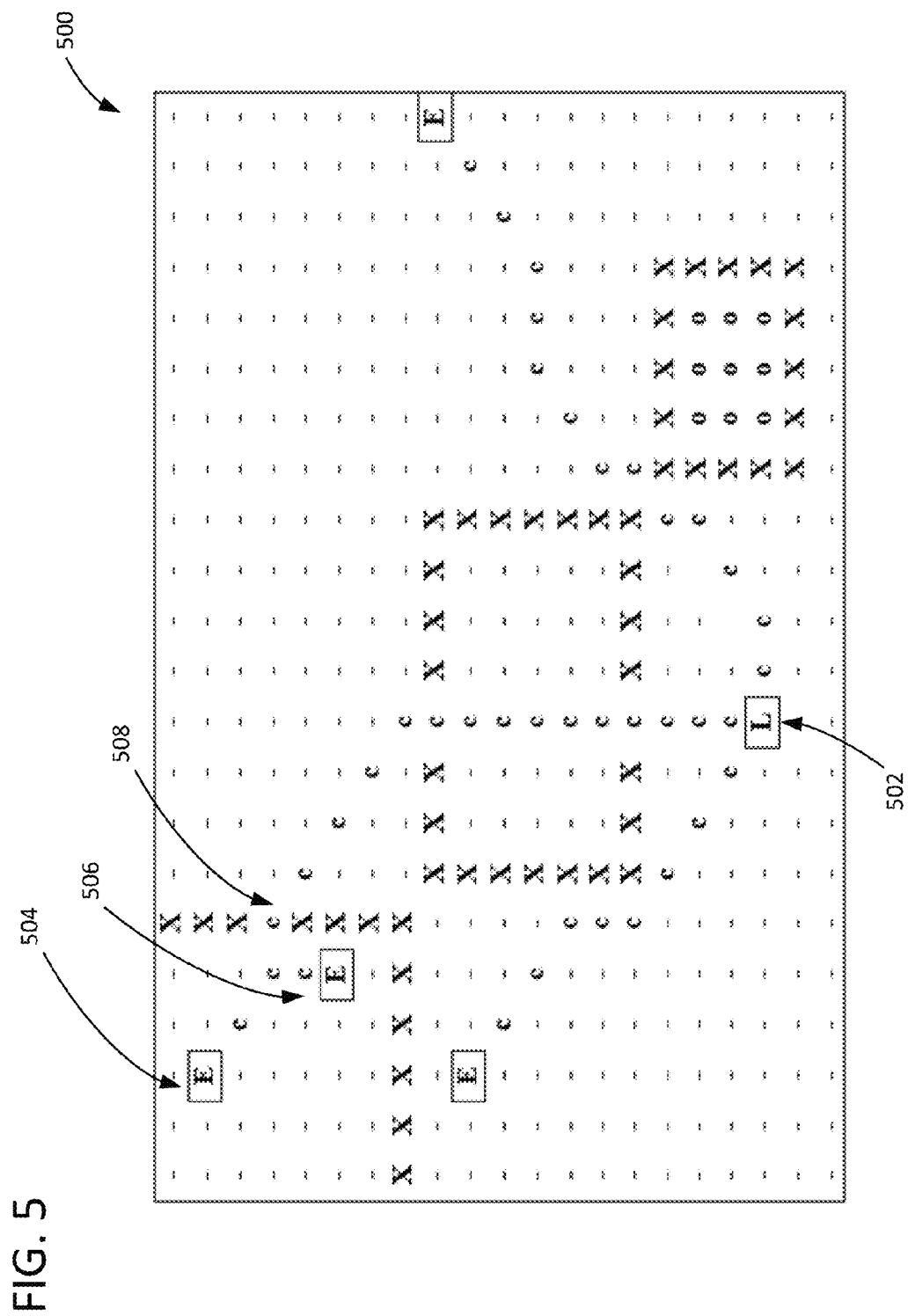
FIG. 5 is a diagram illustrating another example 2D voxel-based representation of a media environment, the voxel-based representation indicating audio paths from sound emitters, around obstructions, to a listener location, where the sound emitter locations and listener locations being different from the diagram of FIG. 4.
Figure 6:
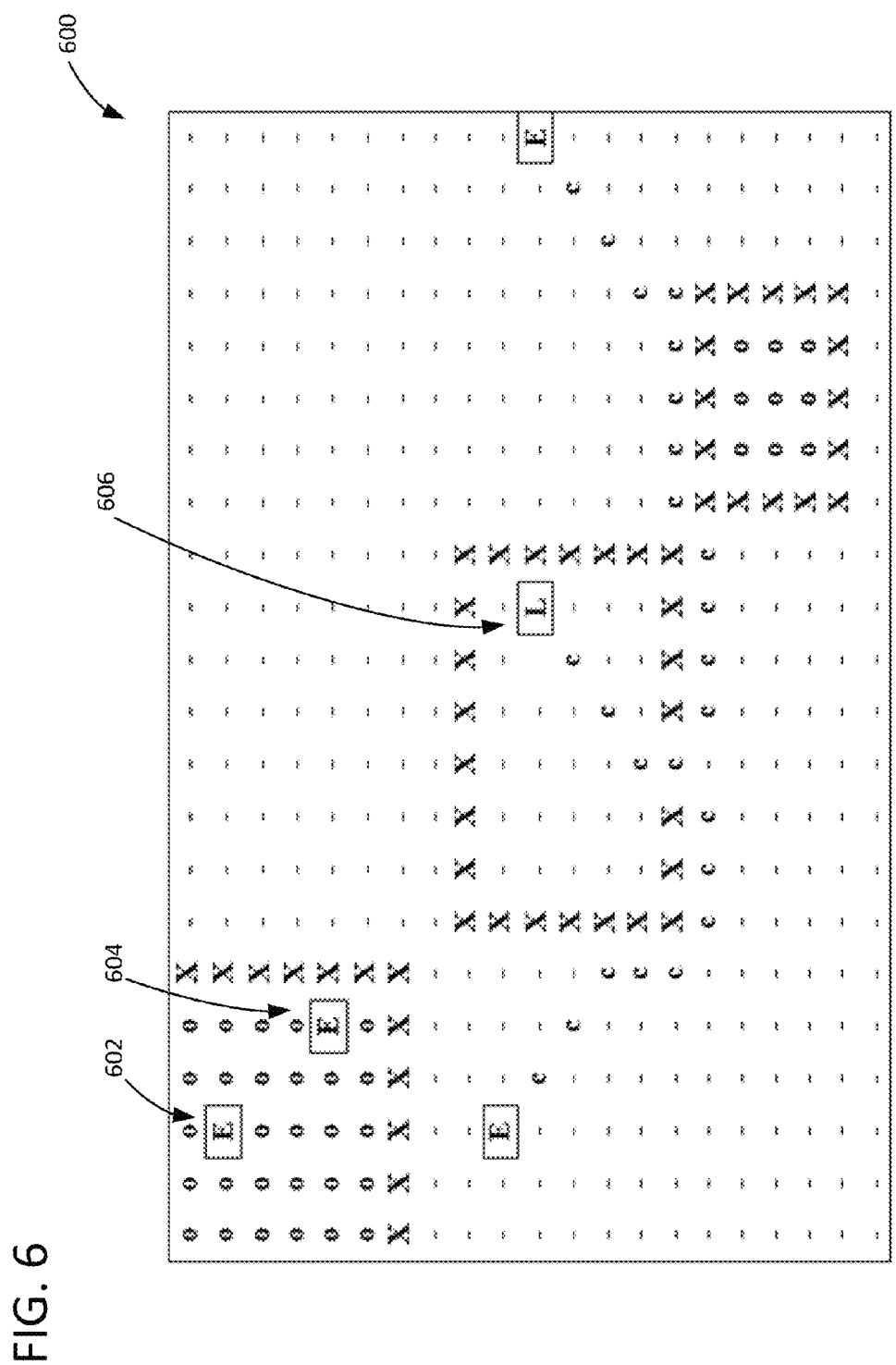
FIG. 6 is a diagram illustrating another example 2D voxel-based representation of a media environment, the voxel-based representation indicating audio paths from sound emitters, around obstructions, to a listener location, where two of the sound emitters are occluded.

FIGS. 4-6 illustrate additional 2D examples in which sound emitters, blocked voxels, and a listener are located. In 2D voxel-based representation 400 of FIG. 4, a listener 402 is mostly surrounded by blocked voxels (denoted by an "X"). Clear voxels are denoted with "-", sound emitters are denoted as "E" surrounded by a box, and voxels along the clear-voxel path from the sound emitters to listener 402 are indicated as "c". The grid framework shown in FIGS. 2 and 3 is omitted for clarity, as are path distances. Because of listener 402's location inside a rectangle of blocked voxels with only one clear voxel, voxel 404, the clear voxel path for each sound emitter passes through voxel 404. Voxel group 406 are occluded voxels, denoted with "o". The occluded voxels are entirely surrounded by blocked voxels, indicating that audio from the sound emitters cannot reach voxel group 406.

FIG. 5 illustrates 2D voxel-based representation 500. As in FIG. 4, "X" indicates blocked voxels, sound emitters are denoted as "E" surrounded by a box, "c" indicates voxels along the clear-voxel path from the sound emitters to listener 502, and occluded voxels are denoted by an "o". In representation 500, sound emitted by both emitters 504 and 506 travels through clear voxel 508 on the clear voxel path to listener 502.

FIG. 6 illustrates 2D voxel-based representation 600. In FIG. 6, sound emitters 602 and 604 are occluded (completely surrounded by blocked voxels), and thus there is no clear voxel path from sound emitters 604 and 602 to listener 606.

Figure 7:
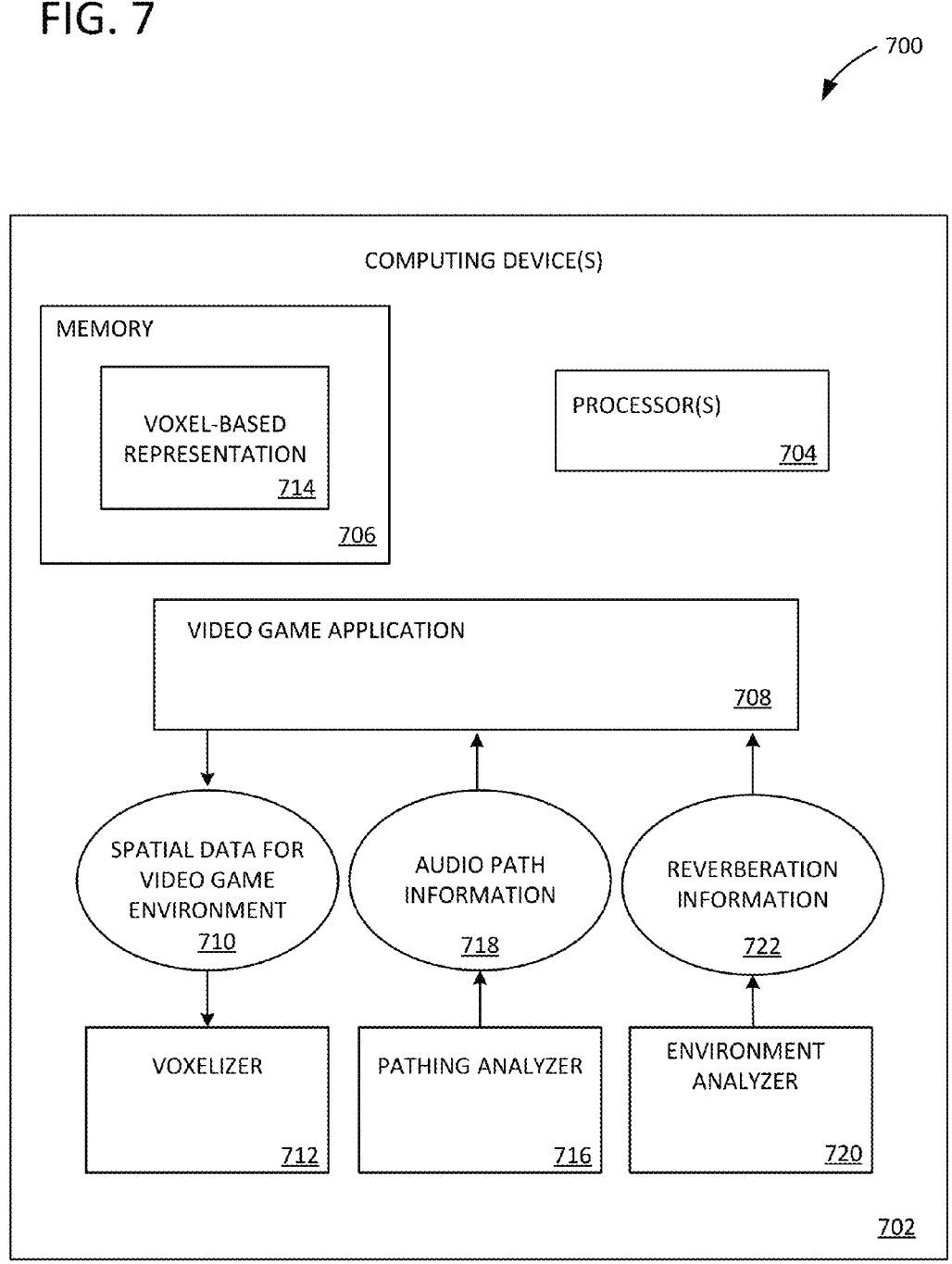
FIG. 7 is a block diagram of an example acoustic adjustment system that includes an environment analyzer.

FIG. 7 illustrates a system 700 implemented on one or more computing device(s) 702. Computing device(s) 702 includes processor(s) 704 and a memory 706. Computing device(s) 702 can be a game console, a desktop computer, laptop computer, mobile device, or other computing device. A video game application 708 is running on computing device 702 and provides spatial data 710 defining a 3D video game environment. A voxelizer 712, which can be similar to voxelizer 108 of FIG. 1, generates a voxel-based representation 714 of the game environment.

A pathing analyzer 716, which can be similar to pathing analyzer 114 of FIG. 1, determines audio path information 718, which can be similar to audio path information 116 of FIG. 1. An environment analyzer 720 is configured to determine, by processor 704, a distance, from the location of a listener, to a blocked voxel in respective directions of a plurality of directions. The distances indicate a sound reverberation adjustment to audio reaching, in the 3D interactive media environment, the location of the listener. In some examples, the nearest blocked voxel is determined in each of 26 directions from the location of the listener. Other numbers of directions are also contemplated. Environment analyzer 720 provides reverberation information 722 to video game application 708 based at least in part on the distances. Reverberation information 722 can include the distances and can also or alternatively include early reflection values and late reverberation values determined based on the distances.

Environment analyzer 720 can also be configured to determine, by processor 704, a distance, from the location of a sound emitter, to a blocked voxel in respective directions of a plurality of directions. The distances indicate a sound reverberation adjustment to the audio emanating, in the 3D interactive media environment, from the location of the sound emitter. As with the listener location, in some examples, the nearest blocked voxel is determined in each of 26 directions from the location of the sound emitter. Reverberation information 722 can also include the distances and/or early reflection values and late reverberation values for the sound emitter.

In some examples, environment analyzer 720 is further configured to determine, by processor 704, a material type of the blocked voxels in the respective directions. The material type indicates an additional sound reverberation adjustment to audio reaching, in the 3D interactive media environment, the location of the listener. For example, an aluminum surface reflects sound differently than a wood surface, and knowing the material type allows reverberation calculations to be adjusted. Material type information for the geometry of the game (and therefore for the blocked voxels) can be included with the spatial data 710 that defines the 3D video game environment.

In some examples system 700 also includes an audio mixer (not shown) configured to, by processor 704, adjust one or more audio signals that, in the 3D interactive environment, reach the location of the listener, the adjusting based at least in part on the audio path information. The audio mixer can be part of video game application 708 or can be a separate component of system 700.

In some examples, voxelizer 712, pathing analyzer 716, and environment analyzer 720 are implemented as a library, plugin(s), or application(s) accessible to video game application 708 and other applications through an application program interface (API). In such an arrangement, voxelizer 712, pathing analyzer 716, and environment analyzer 720 can be implemented on a computing device, and different video games or virtual reality applications can access them. Pathing analyzer 716 and environment analyzer 720 can be configured to provide different types of output (e.g., clear voxel path distance vs. ratio) depending upon the application interacting with voxelizer 712, pathing analyzer 716, and environment analyzer 720. In some examples, voxelizer 712, pathing analyzer 716, and environment analyzer 720 are part of video game application 708. In some examples, at least one of voxelizer 712, pathing analyzer 716, or environment analyzer 720 are implemented in the cloud and accessible via a cloud-based or local video game application or other application.

Figure 8:
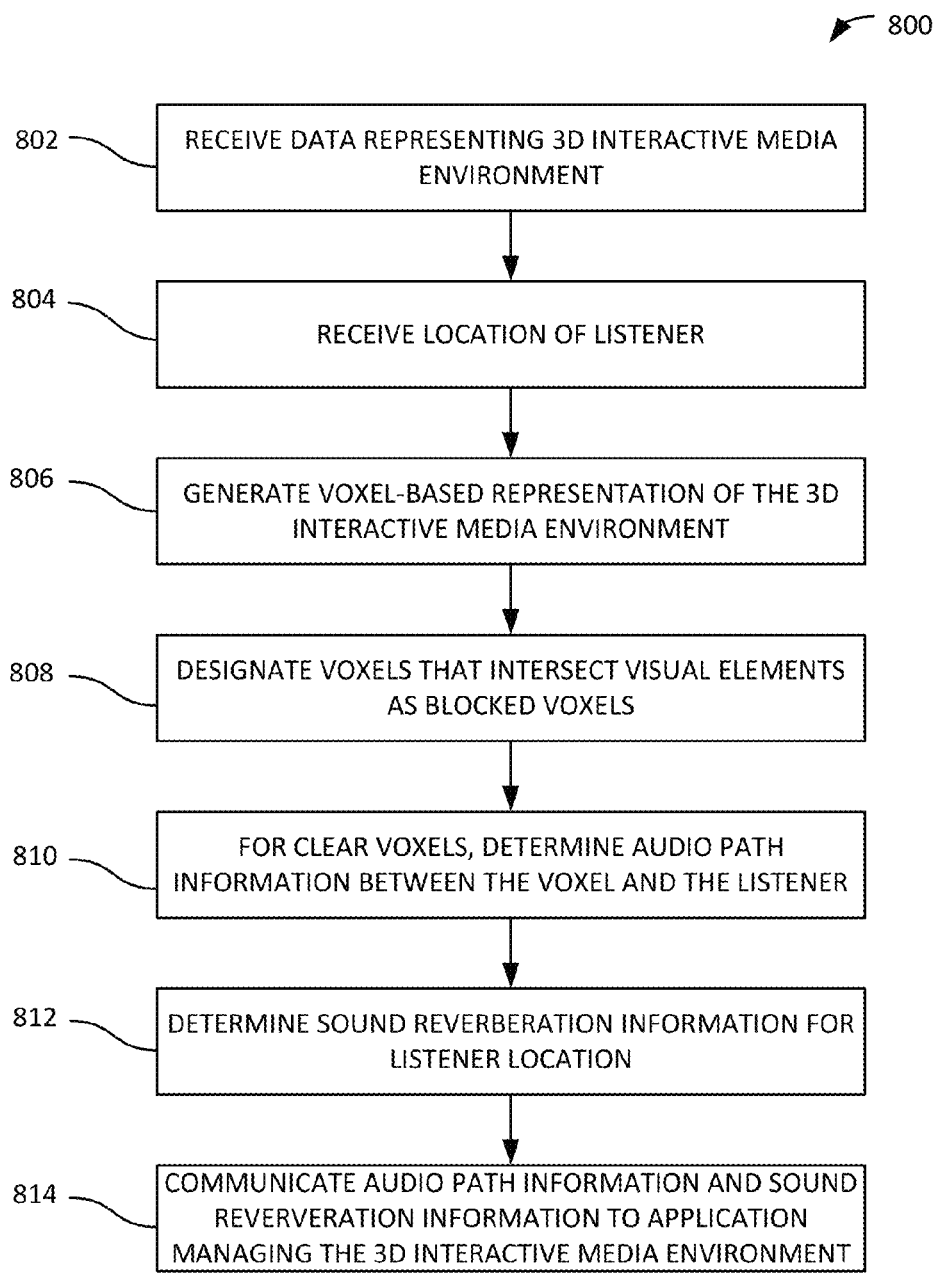
FIG. 8 is a flowchart illustrating an example acoustic adjustment method.

FIG. 8 illustrates a method 800 for acoustic adjustment. In process block 802, data representing a 3D interactive media environment is received. In process block 804, the location of a listener within the 3D interactive media environment is received. In process block 806, based on the data representing the 3D interactive media environment, a voxel-based representation of the 3D interactive media environment is generated. The voxel-based representation can include a plurality of voxels of a uniform size. In process block 808, voxels, of the plurality of voxels, that intersect a visual element of the 3D interactive media environment are designated as blocked voxels.

For respective voxels of the plurality of voxels that are clear voxels, wherein clear voxels are voxels other than blocked voxels, audio path information between the voxel and the location of the listener is determined in process block 810. The audio path information can include clear voxel path distances, ratios of the clear voxel path to a direct path, angles to the next voxel along the clear voxel path, obstruction values, and/or occlusion values. In process block 812, sound reverberation information is determined for the location of the listener. In process block 814, both (i) the audio path information for one or more of the respective clear voxels and (ii) the sound reverberation information are communicated to an application managing the 3D interactive media environment (e.g., a video game or virtual reality application). Method 800 can be performed, for example, by system 100 of FIG. 1 and/or system 700 of FIG. 7.

Figure 9:
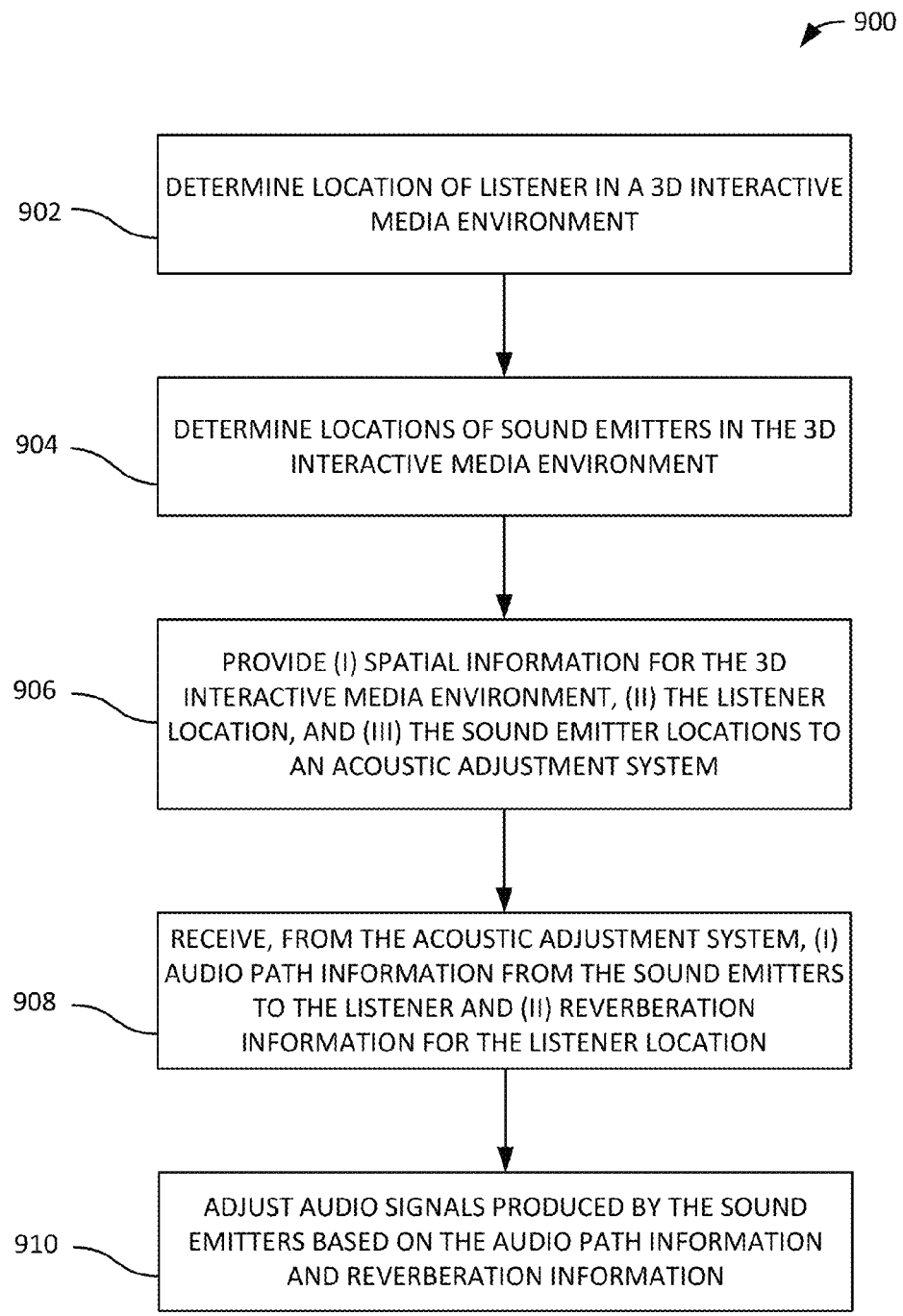
FIG. 9 is a flowchart illustrating an example acoustic adjustment method in which audio signals produced by sound emitters are adjusted.

FIG. 9 illustrates a method 900 for acoustic adjustment. In process block 902, the location of a listener in a three-dimensional (3D) interactive media environment is determined. In process block 904, locations of one or more sound emitters in the 3D interactive media environment are determined. In process block 906, (i) spatial information for the 3D interactive media environment, (ii) the location of the listener, and (iii) the location of the one or more sound emitters are provided to an acoustic adjustment system configured to generate a voxel-based representation of the 3D interactive media environment and analyze the propagation of audio signals within the 3D interactive media environment. The acoustic adjustment system can be similar to, for example, system 100 of FIG. 1 or system 700 of FIG. 7. In process block 908, (i) audio path information from the locations of the one or more sound emitters to the location of the listener and (ii) reverberation information for the location of the listener are received from the acoustic adjustment system. In process block 910, audio signals produced by the one or more sound emitters are adjusted based on the audio path information and the reverberation information. Method 900 can be performed, for example, by a computing device running a video game, virtual reality application, or augmented reality application.

In some examples, a media environment is very large and contains a large amount of empty space. As an example, consider a first-person boat navigating through a largely empty ocean to a distant island. In such examples, different portions of the game volume can be defined over which a voxel-based representation can be created and audio path information, etc., generated, and some portions for which a voxel-based representation is not generated. To continue the above example, the "local" environment around the boat, and perhaps the environment around the distant island, can be voxelized, and audio paths can be determined in accordance with the described approaches, but much of the empty ocean environment is not analyzed (e.g., clear voxel paths are not determined) to save computing power. In such cases, sound reaching the edge of the island environment can be propagated to the local boat environment using a simple straight-line propagation path. In this example, updates performed as the listener moves in the media environment can trigger a redetermination of clear voxel paths for the local environment and distant island environment rather than for the entire environment.

Example Computing Systems

Figure 10:
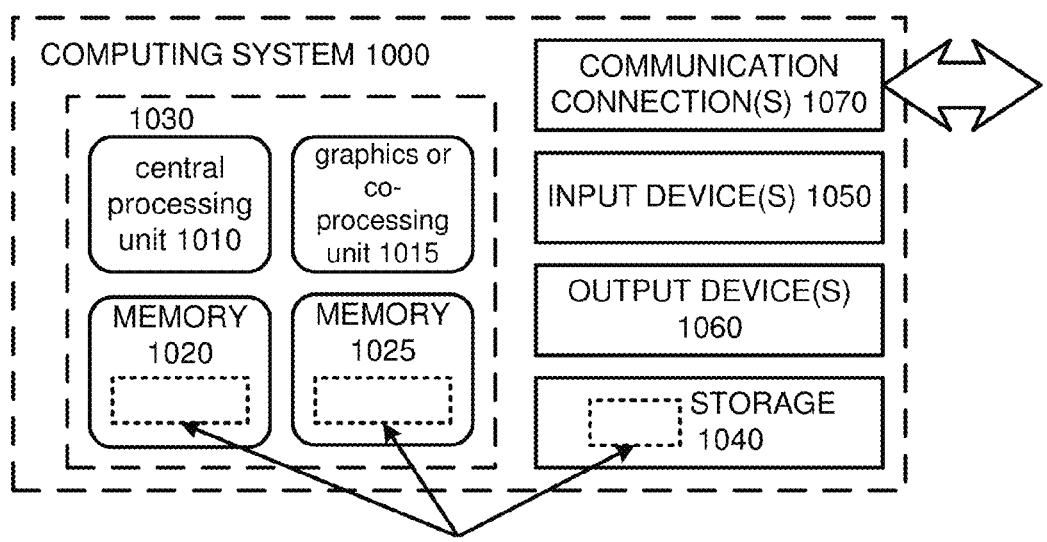
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, memory 1020, 1025 can store voxelizer 108 and/or pathing analyzer 114 of FIG. 1 and/or voxelizer 712, pathing analyzer 716, and/or environment analyzer 720 of FIG. 7.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more innovations described herein. For example, storage 1040 can store voxelizer 108 and/or pathing analyzer 114 of FIG. 1 and/or voxelizer 712, pathing analyzer 716, and/or environment analyzer 720 of FIG. 7.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 11:
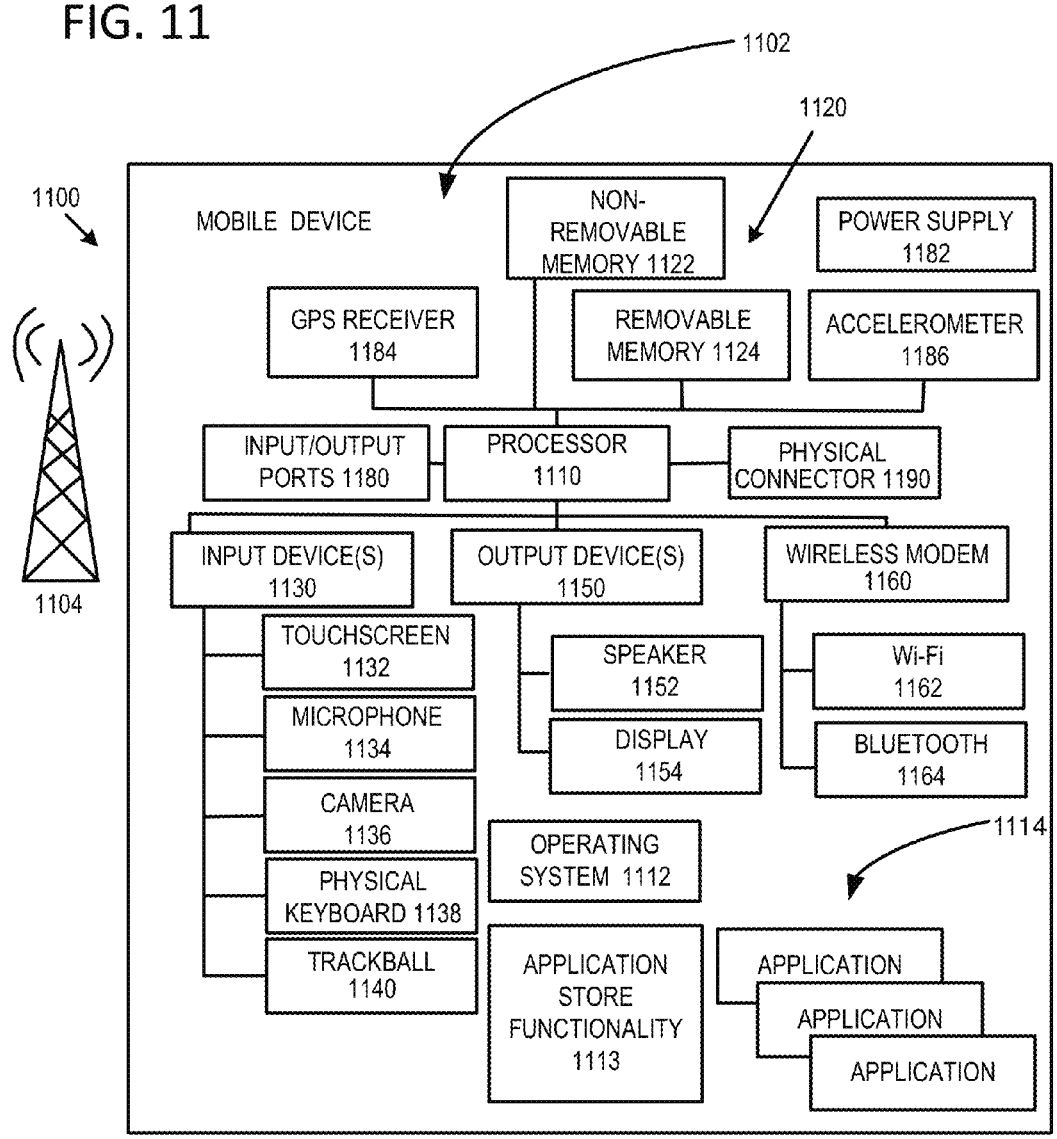
FIG. 11 is an example mobile device that can be used in conjunction with the technologies described herein.

FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application. The application programs 1114 can also include image recognition technology implemented using convolutional neural networks. Functionality 1113 for accessing an application store can also be used for acquiring and updating application programs 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Example Cloud-Supported Environments

Figure 12:
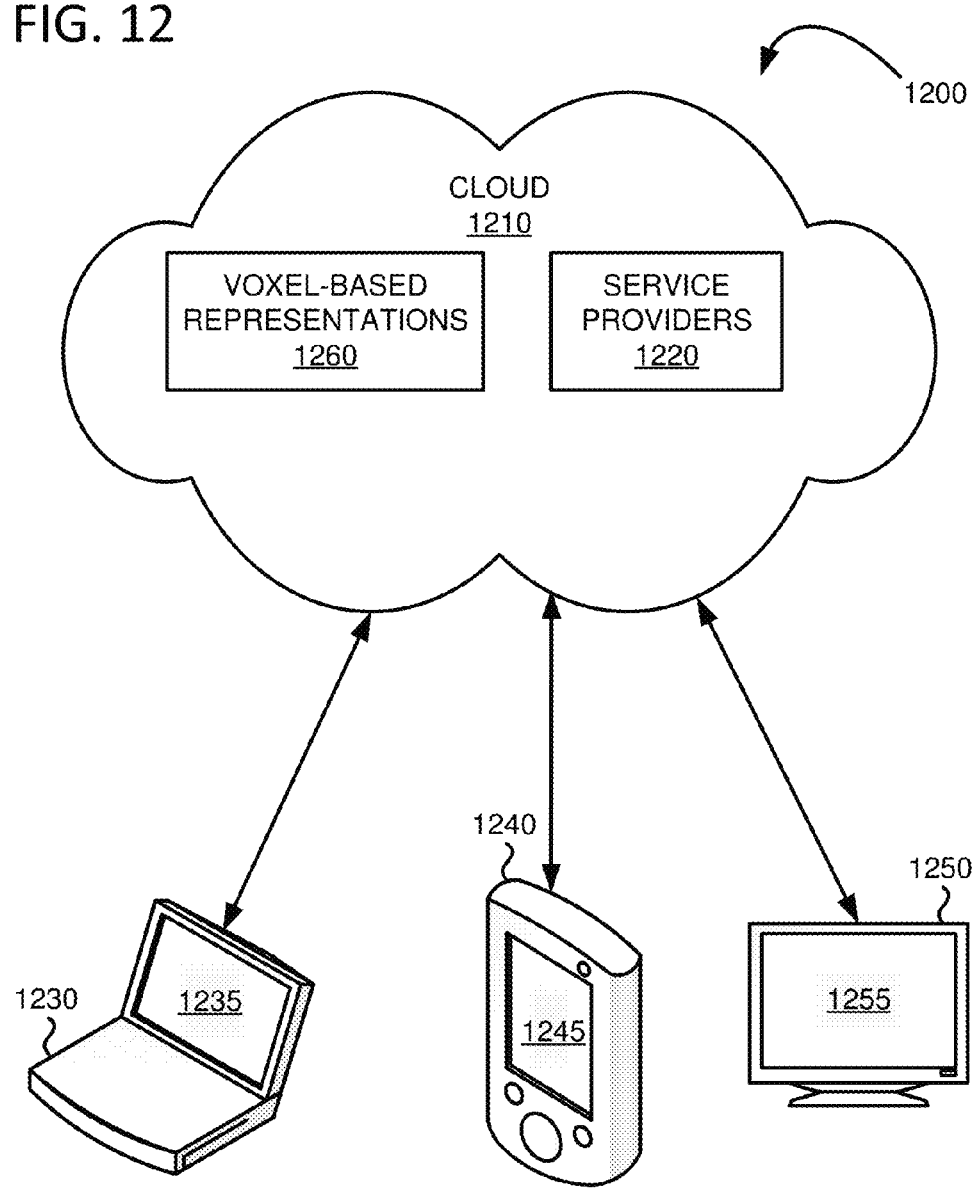
FIG. 12 is an example cloud-supported environment that can be used in conjunction with the technologies described herein.

FIG. 12 illustrates a generalized example of a suitable cloud-supported environment 1200 in which described embodiments, techniques, and technologies may be implemented. In the example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250) while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid-size screen). For example, connected device 1230 can be a personal computer such as desktop computer, laptop, notebook, netbook, or the like. Connected device 1240 represents a device with a mobile device screen 1245 (e.g., a small size screen). For example, connected device 1240 can be a mobile phone, smart phone, personal digital assistant, tablet computer, and the like. Connected device 1250 represents a device with a large screen 1255. For example, connected device 1250 can be a television screen (e.g., a smart television) or another device connected to a television (e.g., a set-top box or gaming console) or the like. One or more of the connected devices 1230, 1240, 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touchscreen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users). The cloud 1210 can store voxel-based representations 1260 used in acoustic adjustment as described herein.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. By way of example and with reference to FIG. 11, computer-readable storage media include memory and storage 1120, 1122, and 1124. The term computer-readable storage media does not include signals and carrier waves. In addition, the term computer-readable storage media does not include communication connections (e.g., 1070, 1160, 1162, and 1164).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method for acoustic adjustment, the method comprising:

determining a location of a listener in a three-dimensional (3D) interactive media environment;

determining locations of one or more sound emitters in the 3D interactive media environment;

providing (i) spatial information for the 3D interactive media environment, (ii) the location of the listener, and (iii) the location of the one or more sound emitters to an acoustic adjustment system configured to generate a voxel-based representation of the 3D interactive media environment and analyze the propagation of audio signals within the 3D interactive media environment;

receiving, from the acoustic adjustment system, (i) audio path information from the locations of the one or more sound emitters to the location of the listener and (ii) reverberation information for the location of the listener, wherein the reverberation information comprises a distance from the location of the listener to a blocked voxel in multiple directions; and adjusting audio signals produced by the one or more sound emitters based on the audio path information and the reverberation information.

2. The method of claim 1, wherein the audio path information reflects, for respective voxels, of the voxel-based representation, in which the one or more sound emitters are located, a distance of a path of clear voxels between the voxel and the location of the listener.

3. An acoustic adjustment system, comprising:

a processor;

a memory;

a voxelizer configured to:

generate, by the processor, a voxel-based representation of a three-dimensional (3D) interactive media environment, the voxel-based representation comprising a plurality of voxels, store the voxel-based representation of the 3D interactive media environment in the memory, and identify, by the processor, a plurality of blocked voxels, wherein blocked voxels are voxels that intersect visual elements of the 3D interactive media environment; and a pathing analyzer configured to:

determine, by the processor and for respective voxels of the plurality of voxels that are clear voxels, audio path information representing a path of clear voxels between the voxel and a location of the listener, wherein clear voxels are voxels other than blocked voxels, and wherein the audio path information comprises a length of the path of clear voxels; and determine a ratio of the length of the path of clear voxels to a shortest distance between the voxel and the location of the listener, wherein the shortest distance corresponds to the length of a line connecting the voxel and the location of the listener, and wherein the ratio indicates an audio adjustment that accounts for the length of the path of clear voxels.

4. The system of claim 1, wherein the path of clear voxels indicates a path of sound, in the 3D interactive media environment, between a location corresponding to the voxel and the location of the listener.

5. The system of claim 1, wherein the 3D interactive media environment is at least one of a video game environment, a virtual reality environment, or an augmented reality environment.

6. The system of claim 1, wherein the system is part of a video game console, and wherein the pathing analyzer is configured to provide audio path information for a voxel in response to a request from a video game application.

7. The system of claim 1, wherein the path of clear voxels is a shortest clear-voxel path between the location of the listener and the voxel.

8. The system of claim 1, wherein the audio path information comprises an angle from the voxel to the next voxel of the path of clear voxels.

9. The system of claim 1, wherein the pathing analyzer is further configured to determine, by the processor and for the respective voxels of the plurality of voxels that are clear voxels, audio path information representing one or more additional paths of clear voxels between the voxel and the location of the listener.

10. The system of claim 1, further comprising an audio mixer configured to, by the processor, adjust one or more audio signals that, in the 3D interactive environment, reach the location of the listener, the adjusting based at least in part on the audio path information.

11. The system of claim 1, further comprising an environment analyzer configured to determine, by the processor, a distance, from at least one of the location of the listener or a location of a sound emitter, to a blocked voxel in respective directions of a plurality of directions, wherein the distances indicate a sound reverberation adjustment to audio reaching, in the 3D interactive media environment, the location of the listener, or to audio originating, in the 3D interactive media environment, from the sound emitter.

12. The system of claim 11, wherein the environment analyzer is further configured to determine, by the processor, a material type of the blocked voxels in the respective directions, wherein the material type indicates an additional sound reverberation adjustment to audio reaching, in the 3D interactive media environment, the location of the listener.

13. One or more hardware computer-readable memory or storage devices storing computer-executable instructions for acoustic adjustment, the adjustment comprising:
 receiving data representing a three-dimensional (3D) interactive media environment;
 receiving a location of a listener within the 3D interactive media environment;
 based on the data representing the 3D interactive media environment, generating a voxel-based representation of the 3D interactive media environment, the voxel-based representation comprising a plurality of voxels of a uniform size;
 designating voxels, of the plurality of voxels, that intersect a visual element of the 3D interactive media environment as blocked voxels;
 for respective voxels of the plurality of voxels that are clear voxels, wherein clear voxels are voxels other than blocked voxels, determining audio path information between the voxel and the location of the listener;
 determining sound reverberation information for the location of the listener, wherein the determining comprises determining a distance from the location of the listener to a blocked voxel in respective directions of a plurality of directions, wherein the distances indicate a sound reverberation adjustment to audio reaching, in the 3D interactive media environment, the location of the listener; and
 communicating (i) the audio path information for one or more of the respective clear voxels and (ii) the sound reverberation information to an application managing the 3D interactive media environment.

14. The one or more hardware computer-readable memory or storage devices of claim 13, wherein the 3D interactive media environment is a video game environment, and wherein the application is a video game.

15. The one or more hardware computer-readable memory or storage devices of claim 13, wherein the audio path information comprises at least one of an obstruction value or an occlusion value.

16. The one or more hardware computer-readable memory or storage devices of claim 13, wherein the one or more clear voxels for which the audio path information and sound reverberation information are communicated are locations of sound emitters in the 3D interactive media environment.

17. The one or more hardware computer-readable memory or storage devices of claim 13, wherein audio path information and sound reverberation information are determined for clear voxels within one or more areas and not determined for clear voxels outside of the one or more areas.

* * * * *